Figure 1:
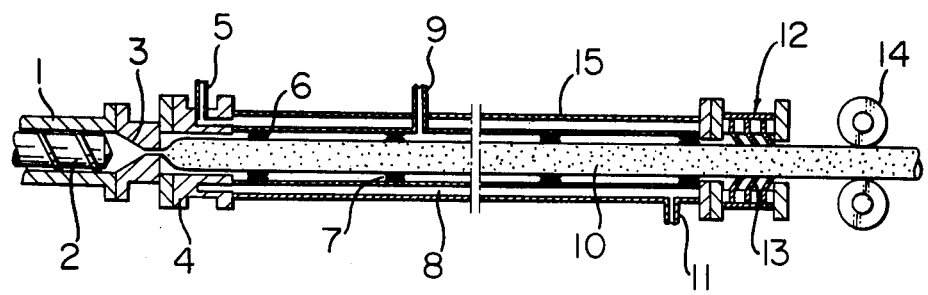

United States Patent [19]

Inokuchi et al.

[11] 4,284,596
[45] Aug. 18, 1981

[54] PROCESS FOR PRODUCING FOAMED ARTICLES OF AROMATIC POLYESTERS

[75] Inventors: Norio Inokuchi, Hino; Teruhisa Fukumoto; Yoshio Mori, both of Sagamihara, all of Japan

[73] Assignee: Teitin Limited, Osaka, Japan

[21] Appl. No.: 110,399

[22] Filed: Jan. 8, 1980

[30] Foreign Application Priority Data

Sep. 21, 1979 [JP] Japan ................................. 54-120808

[51] Int. Cl.³ ............................................ B29D 27/00
[52] U.S. Cl. ..................................... 264/45.3; 264/50; 264/53; 264/54; 264/101; 264/257; 264/DIG. 5
[58] Field of Search ...................... 264/101, 51, 53, 54, 264/45.3, 257, DIG. 5, 50

[56]         References Cited
         U.S. PATENT DOCUMENTS

| 3,704,083 | 11/1972 | Phipps | 264/101 X |
| 3,822,331 | 7/1974 | Cogliano | 264/101 X |
| 3,927,160 | 12/1975 | Medley | 264/101 X |
| 3,931,379 | 1/1976 | Cruson et al. | 264/101 X |
| 4,163,037 | 7/1979 | Niznik | 264/45.3 X |

FOREIGN PATENT DOCUMENTS

| 53-24364 | 3/1978 | Japan . |
| 54-50568 | 4/1979 | Japan . |
| 54-70364 | 6/1979 | Japan . |

OTHER PUBLICATIONS

McKelvey; James M., "Polymer Processing", New York, John Wiley and Sons, ©1962, pp. 1-5.

Primary Examiner—Philip Anderson
Attorney, Agent, or Firm—Sherman & Shalloway

[57]            ABSTRACT

This invention provides a commercially advantageous process for producing a foamed article of an aromatic polyester, especially a large-sized foamed article of aromatic polyester having a high expansion ratio. The process comprises mixing an aromatic polyester, a polyepoxy compound, a compound of a metal of Group Ia, IIa or IIIa of the periodic table and a blowing agent in a melt extrusion molding machine optionally with a fibrous filler while introducing the blowing agent thereinto under pressure, extruding the molten mixture from the molding machine, further expanding the foamed unsolidified extrudate in an atmosphere maintained at reduced pressure, and solidifying it by cooling in an atmosphere maintained at reduced pressure. The resulting aromatic polyester foamed article has numerous fine cells having uniform volumes, shapes and distribution.

8 Claims, 6 Drawing Figures

PROCESS FOR PRODUCING FOAMED ARTICLES OF AROMATIC POLYESTERS

This invention relates to a process for producing a foamed article of an aromatic polyester. More specifically, it relates to a process for producing a foamed article of an aromatic polyester having numerous uniform and fine cells.

Generally, a foamed article of a thermoplastic resin is produced by a method which comprises extruding a molten and plasticized resin composition containing a blowing agent under a high pressure into an atmosphere under atmospheric pressure to expand it by the change of the pressure.

Polystyrene and polyethylene are typical examples of thermoplastic resins used in this method. Selection of a blowing agent for polystyrene is easy because the melt viscosity of polystyrene depends little on temperature and it can be extruded at low temperatures. Moreover, with polystyrene, a viscosity suitable for foaming is easy to obtain. Accordingly, a foamed article of high expansion ratios can be obtained relatively easily from polystyrene. On the other hand, in contrast to these general resins, the melt viscosities of crystalline thermoplastic resins such as aromatic polyesters and polyamides are very much dependent on temperature, and the temperature range in which the resins are highly viscous is very narrow. It has been considered extremely difficult therefore to obtain foamed articles of high expansion ratios, especially large-sized foamed articles, from crystalline thermoplastic resins. The melt viscosity of an aromatic polyester is especially low. When an attempt is made to produce a foamed shaped article of the aromatic polyester by an extrusion foaming method, the sizes and distribution of cells are not uniform, and gases separate from the molten resin mixture. Thus, it is difficult to obtain foamed shaped articles of good quality from aromatic polyesters.

In an attempt to remedy such a defect, it was suggested to use as a raw material a polyester of a high degree of polymerization produced by solid-phase polymerization or by adding a polymerization promoter, or a polyester having an increased melt viscosity obtained by copolymerizing a branching agent. It is generally difficult, however, to obtain a foamed article having uniform fine cells even from such an aromatic polyester having a high degree of polymerization or a high melt viscosity because its melt viscosity is not sufficiently high. Even if a polyester having a sufficiently high melt viscosity can be produced, it lacks versatility, and the manufacturing process is complicated and costly.

Attempts were also made to produce a foamed article from an aromatic polyester having a relatively low melt viscosity (see Japanese Laid-Open Patent Publication Nos. 24364/78, 50568/79, and 70364/79). These methods involving mixing an aromatic polyester with a diepoxy compound, a metal or a metal compound, and a blowing agent at the time of melting and foaming.

Experiments by the present inventors have shown that the cells of foamed articles obtained by these methods starting from polyesters having a relatively low melt viscosity generally have a relatively uniform volume and are distributed relatively uniformly, but that the shapes of the cells differ between the central portion and the surface portion of the article, the cells in the central portion being of relatively spherical shape and the cells in the surface portion having a collapsed shape. It has been found that in a large-sized foamed article, such a non-uniformity in cell shape is remarkable in a direction perpendicular to the extruding direction, and therefore, various properties such as compression strength are deteriorated, and the yield of the products decreases.

It is an object of this invention therefore to provide a process for producing a foamed article of an aromatic polyester having numerous uniform and fine cells.

Another object of this invention is to provide a process for producing with commercial advantage a foamed article of an aromatic polyester having numerous fine cells having uniform volumes, shapes and distribution.

Still another object of this invention is to provide a process for producing a foamed article of an aromatic polyester which have various superior properties required of foamed articles, such as mechanical properties (e.g., compression strength) because it has numerous uniform and fine cells.

Yet another object of this invention is to provide a process for producing with commercial advantage a large-sized foamed article of an aromatic polyester having numerous uniform and fine cells, which can be cut into articles of the desired size and shape which are free from non-uniformity in quality.

A further object of this invention is to provide a process for producing with commercial advantage a foamed article of an aromatic polyester having numerous uniform and fine cells having a high expansion ratio, for example, 20 to 30, corresponding to an apparent density of 0.067 to 0.045, by using a conventional melt extrusiion molding machine without any design modification.

A further object of this invention is to provide a foamed article of an aromatic polyester which has superior thermal stability despite its high expansion ratio and therefore its low apparent density.

Other objects and advantages of this invention will become apparent from the following description.

These objects and advantages of this invention are achieved in accordance with this invention by a process for producing a foamed article of an aromatic polyester by mixing an aromatic polyester, 0.05 to 5% by weight, based on the aromatic polyester, of a polyepoxy compound, 0.05 to 3% by weight, based on the aromatic polyester, of a compound of a metal of Group Ia, IIa or IIIa of the periodic table, and 0.05 to 30% by weight, based on the aromatic polyester, of a blowing agent in a melt extrusion molding machine while introducing the blowing agent thereinto under pressure, said process comprising mixing said materials optionally with a fibrous filler in said melt extrusion molding machine, then extruding the molten mixture from said extrusion molding machine, further expanding the extruded and unsolidified foamed article in an atmosphere maintained at reduced pressure, and solidifying said article by cooling in an atmosphere maintained at reduced pressure.

The process of this invention is characterized in that a foamable molten mixture comprising an aromatic polyester is extruded from an extruder, and the foamed extrudate which is still unsolidified is further expanded in an atmosphere maintained at reduced pressure and solidified by cooling in an atmosphere maintained at reduced pressure.

Surprisingly, the present invention can afford a foamed article of aromatic polyester having numerous cells with uniform volumes, sizes and distribution in contrast to a foamed article having cells collapsed in the extruding direction which is produced by a conventional method involving expanding and solidification at atmospheric pressure.

The expansion and subsequent solidification by cooling in an atmosphere maintained under reduced pressure have not been known heretofore as far as the present inventors know. To the best of the knowledges of the present inventors, conventional processes for the production of a foamed article from a thermoplastic material involve expansion and subsequent solidification under atmospheric or elevated pressures.

In the process of this invention, expansion and solidification are carried out in an atmosphere maintained at reduced pressure. If solidification after expansion is performed at atmospheric or elevated pressures, the cellular structure of the resulting foamed article would shrink. Preferably, the pressure of the atmosphere in which solidification is carried out in the process of this invention is nearly equal to the pressure of the atmosphere in which expansion is performed. Some difference in pressure, for example about 30 to 80 mmHg ab., does not substantially pose any problem.

The present inventors first expected that if expansion and solidification are both carried out in an atmosphere maintained at reduced pressure, a foamed article having cells of non-uniform shapes and distribution would be obtained as is the case with the conventional process involving expansion and solidification under atmospheric or elevated pressures. Unexpectedly, however, the present invention affords a foamed article of aromatic polyester having cells with uniform shapes and distribution, especially cells of uniform shapes.

The process of this invention can be practised advantageously by means of a melt extrusion molding machine and a sizing device directly connected to it. The sizing device is used to expand the extruded foamable polyester composition and solidifying it by cooling therein. For this purpose, the sizing device includes sizing sleeves therein, a vacuum suction opening for maintaining a reduced pressure inside the device, and a cooling jacket, preferably a water-cooling jacket, for cooling its wall.

The process of this invention is described in more detail below with reference to FIG. 1 which shows one embodiment of apparatus for practising the process of this invention.

FIG. 1 is a schematic partial sectional view showing the apparatus used for practising the process of this invention together with a foamed article produced by using this apparatus.

Referring to FIG. 1, the reference numeral 1 represents an extruder; 2, a screw in the extruder 1; 3, a die constituting part of the extruder 1; 4, a connecting sleeve; 5 and 11, an inlet and an outlet for cooling water; 6, a sizing sleeve; 7, an opening for air to produce vacuum; 8, a passage of a cooling water stream for a cooling jacket; 9, an opening for air sucking to produce vacuum; 10, a foamed article; 12, a sealing sleeve; 13, a packing within the sealing sleeve 12; 14, a take-up device for the foamed article 10; and 15, a housing of the sizing device. A conventional expansion molding machine is used as the extruder 1. The sizing apparatus 15 includes sizing sleeves 6 provided therein at predetermined intervals, a sizing cylinder having the air sucking opening 9 for reducing the pressure inside, and a cooling jacket having water passage 8 on the outside of the sizing cylinder. The cooling water passage 8 communicates with the inlet 5 and out 11 for the cooling water. For example, the cooling water supplied from the inlet 5 passes through the passage 8, and is discharged from the outlet 11. The sizing sleeves 6 provided at predetermined intervals in the sizing cylinder may have at their circumferential portion at least one vacuum opening 7 which communicates with the spaces defined by the sizing sleeves. The shape of the sizing sleeves 6 can be changed according to the shape of the cross-section of the desired foamed article. The air sucking opening 9 may be provided at any desired part of the sizing cylinder, and preferably, a part at which the effect of the sucking opening 9 can be fully exhibited is selected. When it is desired to change the degree of vacuum in each of the spaces in the housing of the sizing device which are defined by sizing sleeves not having a vacuum opening, it is possible to divide the housing of the sizing device into two or more sections by the sizing sleeves and provide an air sucking opening 9 in each section.

One or more packings 13 are provided in the sealing sleeve to separate the pressure inside the housing of the sizing device from the pressure of the outer atmosphere. To permit easy passage of a foamed article, the packing 13 is suitably made of, for example, a soft resin and rubbers (natural, synthetic or composite rubbers).

Referring to FIG. 1, an aromatic polyester extruded from the die 3 passes through the connecting sleeve 4, and is expanded and solidified by cooling in the housing of the sizing device maintained at a predetermined degree of vacuum. The solidified foamed article is continuously taken out by the take-up device 14 via the sealing sleeve 12.

In the process of this invention, expansion and solidification are performed in an atmosphere kept at reduced pressure as described hereinabove. Generally, a foamed article of a higher expansion ratio can be obtained at a higher degree of pressure reduction, i.e. a lower pressure. For example, when polyethylene terephthalate is used as an aromatic polyester and carbon dioxide gas is used as a blowing agent, and the pressure of the atmosphere for expansion and the pressure of the atmosphere for solidification are about 460 mmHg ab. and about 160 mmHg ab., respectively, an expansion ratio of about 20 and about 30 respectively can be obtained under certain conditions.

The expansion and solidification in the process of this invention are carried out preferably under a pressure of not more than about 560 mmHg ab. as pressures capable of easily giving a foamed article having an expansion ratio of at least about 15.

As stated above, the pressure of the atmosphere in which expansion is carried out and the pressure of the atmosphere in which solidification is carried out are preferably nearly equal to each other, but a difference of about 30–80 mmHg ab. is permissible.

The length of the sizing device in which expansion and especially cooling are carried out varies depending upon the temperature of the molten composition comprising the aromatic polyester, the size of the desired foamed article, the expansion ratio, the cooling effect, etc. It is generally believed that expansion and solidification proceed successively. Since according to the process of this invention, these steps are carried out in the same sizing device, it is not always necessary to consider the expansion and solidification as separate steps.

The length required of the sizing device can be easily determined by those skilled in the art by performing preliminary experiments. One measure which is to be determined by such a preliminary experiment is that the foamed article withdrawn from the sizing device should thereafter show little or no change in shape at atmospheric pressure.

Accordingly, the "solidification by cooling" carried out in the sizing device by the process of this invention should be understood as meaning that the foamed article is solidified by cooling until the foamed article taken out from the sizing device does not subsequently change substantially in the desired shape at room temperature; namely, that at least the surface of the foamed article is solidified by cooling to such an extent that the foamed article does not change in the desired shape and has self-supporting property. Thus, in the process of this invention, it is not necessary that the resulting foamed article is cooled to its inside.

When the process of this invention is performed by using the aforesaid extrusion molding machine and the sizing device directly connected to it, the operation is preferably started by continuously taking up the foamed article extruded from the die 3 by the take-up device, and then connecting the extruder 1 to the sizing device 15 by means of a clamping means such as a bolt. After connecting the extruder and the sizing device, the inside of the sizing device is maintained at reduced pressure, and the process of this invention is performed. The desired foamed article can thus be produced continuously.

From the standpoint of the convenience of operation, the sizing device is made movable in a direction going away from the extrusion molding machine fixed generally to a stand, and preferably it is made movable horizontally.

In the process of this invention, the aromatic polyester (A), the polyepoxy compound (B), the compound (C) of a metal of Groups Ia, IIa or IIIa of the periodic table, the blowing agent (D), and the fibrous filler (E) are used as raw materials.

The materials (A) to (D) are essential ingredients, and the fibrous filler (E) is used optionally when the resulting foamed article is required to have thermal stability.

The aromatic polyester (A) used in the process of this invention is a polyester derived from a dicarboxylic acid component composed mainly of an aromatic dicarboxylic acid and a diol component. Preferably, the aromatic dicarboxylic acid component accounts for at least 85 mole% of the entire carboxylic acid component. The proportion of an acid component other than the aromatic dicarboxylic acids, such as a hydroxycarboxylic acid or an aliphatic dicarboxylic acid, is preferably not more than 15 mole% based on the total carboxylic acid component.

Typical examples of the aromatic dicarboxylic acids are terephthalic acid, isophthalic acid, naphthalenedicarboxylic acid, diphenyletherdicarboxylic acid, diphenyldicarboxylic acid, diphenylsulfonedicarboxylic acid and diphenoxyethanedicarboxylic acid.

Examples of the other carboxylic acids include hydroxycarboxylic acids such as p-hydroxybenzoic acid, and aliphatic dicarboxylic acids such as succinic acid, adipic acid and sebacic acid.

Typical examples of the diol include polymethylene-α,ω-diols such as ethylene glycol, trimethylene glycol, tetramethylene glycol and hexamethylene glycol, neopentyl glycol, cyclohexane dimethylol, tricyclodecane dimethylol, 2,2-bis(4-β-hydroxyethoxyphenyl)propane, 4,4'-bis(β-hydroxyethoxy)diphenylsulfone, and diethylene glycol.

The aromatic polyester used in the process of this invention may also contain copolymerized therewith in a small amount a polyfunctional compound as a branching agent such as pentaerythritol, trimethylolpropane, trimellitic acid and pyromellitic acid, and a monofunctional compound as a chain terminating agent such as benzoic acid.

Examples of preferred aromatic polyesters that are used in the process of this invention include aromatic homopolyesters such as polyethylene terephthalate, polybutylene terephthalate and polyethylene-2,6-naphthalenedicarboxylate, and aromatic copolyesters in which at least 50 mole%, preferably at least 70 mole%, of the total recurring units consists of ethylene terephthalate, butylene terephthalate or ethylene-2,6-naphthalenedicarboxylate units.

Of these, polyethylene terephthalate and polybutylene terephthalate are especially preferred.

The aromatic polyester preferably has an intrinsic viscosity, measured at 35° C. in o-chlorophenol as a solvent, of at least 0.4, especially at least 0.5, and not more than 1.3. If its intrinsic viscosity exceeds the specified upper limit, its plastication becomes difficult.

The polyepoxy compound (B) used in the process of this invention denotes a compound having at least two, preferably two or three, especially two, epoxy groups in the molecules.

Typical examples of these polyepoxy compounds include diepoxy compounds of the formula

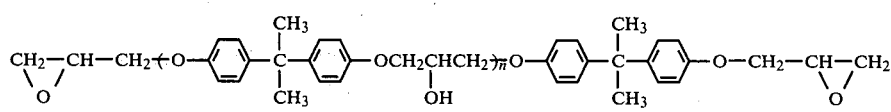

(in which n is a positive number of from 0 to 10), ethylene glycol diglycidyl ether, polyethylene glycol diglycidyl ether, propylene glycol diglycidyl ether, polypropylene glycol diglycidyl ether, polytetramethylene glycol diglycidyl ether, glycerol diglycidyl ether, neopentyl glycol diglycidyl ether, diglycidyl phthalate, diglycidyl terephthalate, dicyclopentadiene diepoxide, 3,4-epoxy-6-methylcyclohexyl-3,4-epoxy-6-methylcyclohexanecarboxylate, 3,4-epoxycyclohexylmethyl-3,4-epoxycyclohexanecarboxylate, and vinylcyclohexane diepoxide; and polyepoxy compounds such as epoxidized soybean oil,

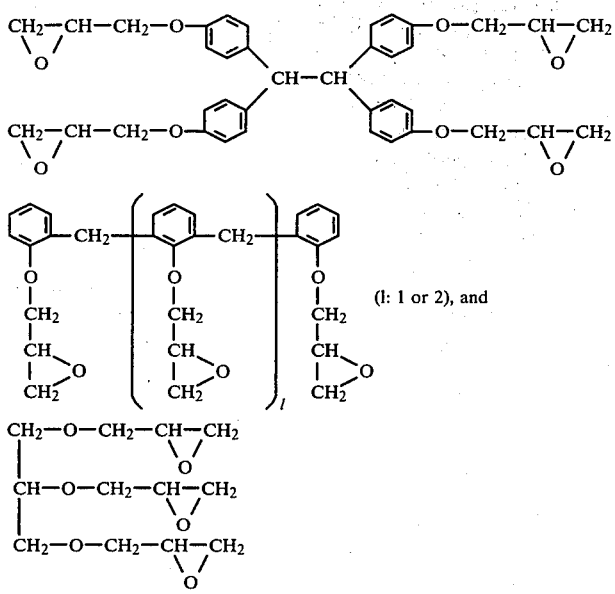

$$\text{CH}_2\text{—O—CH}_2\text{—CH—CH}_2$$
$$\qquad\qquad\quad \backslash\!/$$
$$\qquad\qquad\quad \text{O}$$
$$\text{CH—O—CH}_2\text{—CH—CH}_2$$
$$\qquad\qquad \backslash\!/$$
$$\qquad\qquad \text{O}$$
$$\text{CH}_2\text{—O—CH}_2\text{—CH—CH}_2$$
$$\qquad\qquad\quad \backslash\!/$$
$$\qquad\qquad\quad \text{O}$$

These polyepoxy compound, preferably diepoxy compounds, are used in an amount of 0.05 to 5%, by weight, preferably 0.1 to 4% by weight, based on the aromatic polyester.

If the amount of the polyepoxy compound is less than 0.05% by weight, the melt viscosity of the molten mixture does not increase sufficiently, and it is difficult to form fine cells in the resulting molded article. If, on the other hand, the amount of the polyepoxy compound exceeds 5% by weight, gellation occurs vigorously, and it is difficult to obtain a foamed article because of the suppressed expansion by high viscosity. Even when a foamed article is obtained, its mechanical strength decreases or a marked coloration is caused.

The metallic compound used in the process of this invention is a compound of a metal of Group Ia, IIa or IIIa of the periodic table. For example, organic acid salts, inorganic acid salts, and oxides of metals of Group Ia such as lithium, sodium or potassium, metals of Group IIa such as beryllium, magnesium, calcium or strontium and metals of Group IIIa such as boron or aluminum are preferred.

Typical examples of preferred metal compounds include lithium acetate, sodium acetate, potassium acetate, magnesium acetate, calcium acetate, calcium propionate, magnesium butyrate, sodium caprylate, sodium caprate, magnesium laurate, calcium stearate, potassium stearate, aluminum stearate, sodium montanate, potassium montanate, a sodium salt of montanic acid ester, calcium myristate, calcium benzoate, potassium terephthalate, calcium carbonate, sodium bicarbonate, sodium carbonate, calcium oxide, and magnesium oxide.

The metal compound is used in an amount of 0.05 to 3% by weight, preferably 0.1 to 2% by weight, based on the aromatic polyester. If the amount of the metal compound is outside this range, a foamed article having numerous uniform and fine cells cannot be obtained.

The blowing agent (D) used in the process of this invention may be any of those which are known in the field of foamed products, such as evaporable blowing agents which evaporate under selected temperature and pressure conditions and decomposable blowing agents which decompose under selected temperature and pressure conditions. In the process of this invention, evaporable blowing agents, especially those which have a boiling point at atmospheric pressure of not more than 200° C., above all not more than 150° C., are preferred.

Examples of the blowing agents are inert gases such as carbon dioxide, nitrogen, helium, neon and xenon, saturated aliphatic hydrocarbons, saturated alicyclic hydrocarbons, aromatic hydrocarbons, halogenated saturated hydrocarbons, ethers, and ketones. The saturated aliphatic hydrocarbons include, for example, methane, ethane, propane, butane, pentane and hexane. The saturated alicyclic hydrocarbons include, for example, cyclohexane and ethylcyclopentane. The aromatic hydrocarbons include, for example, benzene and xylene. These hydrocarbons preferably have not more than 8 carbon atoms.

Examples of preferred halogenated saturated hydrocarbons include chlorinated saturated hydrocarbons having not more than 2 carbon atoms such as methyl chloride, methylene chloride, chloroform, carbon tetrachloride, ethyl chloride, dichloroethane and dichloroethylene, fluorinated saturated hydrocarbons having not more than 2 carbon atoms such as carbon tetrafluoride, ethyl fluoride and tetrafluoroethane, and chlorofluorinated saturated hydrocarbons having not more than 2 carbon atoms such as chlorodifluoromethane, dichlorofluoromethane, chlorotrifluoromethane, dichlorodifluoromethane, trichlorofluoromethane, dichlorotetrafluoroethane, trichlorotrifluoroethane, and tetrachlorodifluoroethane.

Preferred ethers are diethers having two etheric oxygen atoms such as methylal, acetal and 1,4-dioxane.

Preferred ketones are those having not more than 4 carbon atoms such as acetone, methyl ethyl ketone, and acetylketone.

Other blowing agents, for example decomposable blowing agents such as azodicarbonamide, p,p'-hydroxybis(benzenesulfonyl hydrazide), p-toluenesulfonyl semicarbazide and 5-phenyltetrazole can also be used.

The blowing agent is used in an amount of 0.05 to 30% by weight, preferably 1 to 20% by weight, based on the aromatic polyester. If the amount of the blowing agent is less than 0.05% by weight, foaming scarcely takes place, and a feasible foamed article cannot be obtained. If the amount exceeds 30% by weight, the blowing agent cannot be completely get into the molten resin, and the gas blows up to make it difficult to obtain a foamed article of the desired shape.

As the optional ingredient (E) used in the process of this invention, an inorganic fibrous material is preferred. Typical examples of the inorganic fibrous materials are glass fibers and carbon fibers. The fibrous filler is used in the process of this invention in a fiber length (weight average fiber length) of not more than about 15 mm, especially about 1 to 15 mm. Those glass fibers or carbon fibers which are used for reinforcing thermoplastic resins and thermosetting resins can be used. For example, chopped strands, milled fibers or glass rovings can be used after having been cut to the desired lengths as described above. The glass fibers will usually break in the extrusion molding machine and become shorter, and in the extruded foamed article, they are usually less than 1 mm in length.

In the process of this invention, such a fibrous filler is used to impart heat resistance to the resulting foamed article. Accordingly, when it is desired to produce foamed articles which do not particularly require heat resistance, it is not necessary to use such a fibrous filler. To increase the heat resistance of the resulting foamed article, the fibrous filler is used in an amount of 1 to 50% by weight, 2 to 30% by weight, based on the aromatic polyester. If the amount of the fibrous filler exceeds 50% by weight, it is difficult to perform extrusion and expansion smoothly and stably in the process of this invention. It is also difficult to obtain a foamed article having numerous uniform cells and a beautiful appearance.

According to the process of this invention, the aforesaid ingredients (A) to (D) and (E) are first mixed in the molten state in a melt extrusion molding machine, and then extruded. The blowing agent (D) is forced under pressure into the molten mixture of the ingredients (A) to (C) and optionally (E) in the melt extrusion molding machine. Forcing of the blowing agent (D) under pressure can be performed for example as follows:

(a) The blowing agent is introduced under pressure through a vent portion provided at the intermediate part of the cylinder in the extruder.

(b) It is introduced under pressure through the vent portion and the die portion.

(c) It is introduced under pressure through two parts in the die portion.

(d) It is introduced under pressure through the vent portion and the two parts of the die portion.

The ingredients (A) to (C) and optionally (E) are mixed in the molten state, for example, as follows.

(e) All the ingredients (A) to (C) and optionally (E) are mixed in a V-blender at a low temperature of, say, not more than 150° C. The resulting mixture is put into a hopper of an extruder, from which it is fed into the extruder where mixing in the molten state is effected. Or all the ingredients are fed into the hopper of the extruder while metering them, and fed from the hopper to the extruder where they are mixed in the molten state.

(f) A polyester comprising the aromatic polyester (A) and the ingredients (B), (C) or (E) is first prepared, and the resulting polyester is mixed at low temperatures with the ingredients (B), (C) or (E) excepting that contained in the polyester. Then, they were mixed in the molten state in the same way as in (e) above.

(f) A polyester containing (A) to (C) or (A) to (C) and (E) is first prepared. The polyester is fed into the hopper, and then mixed in the molten state in the extruder.

(h) The components (A) to (C) and optionally (E) are fed from separate feed openings into a melting zone of an extrusion molding machine, and mixed in the molten state.

Naturally, the mixing in the molten state of the ingredients (A) to (C) and optionally (E) is carried out at a temperature higher than the melting point of the aromatic polyester used. Suitable temperatures can be determined by those skilled in the art. Generally, temperatures of not more than 330° C. are preferred.

According to this invention, an aromatic polyester which has been considered unsuitable for extrusion foaming because of its low melt viscosity can be easily extruded and expanded to give foamed articles having a high expansion ratio of, for example, 40.

The foamed article obtained by this invention has numerous fine cells having uniform volumes, shapes and distribution, and its appearance is beautiful. It also has better chemical resistance than a foamed article of a general commercial resin such as a polystyrene foam. The foamed article in accordance with this invention which contains a fibrous filler further has excellent thermal stability and mechanical strength.

In addition to the ingredients (A) to (E), other fillers, stabilizers, nucleating agents, pigments, fire retardants, antistatic agents, thickeners, etc. may be used. Suitable fillers include needle-like inorganic fillers such as needle-like calcium meta-silicate, needle-like talc, and needle-like potassium titanate, and powdery inorganic fillers such as glass beads, glass flakes, talc, mica, calcium carbonate, clay and titanium oxide.

The following Examples specifically illustrate the present invention.

EXAMPLE 1

Pellets of polyethylene terephthalate having an intrinsic viscosity of 0.64 were dried with hot air at 130° C. for 8 hours. One hundred parts by weight of the resulting dried pellets, 1 part by weight of a diglycidyl ether of bisphenol A, 0.3 part by weight of sodium montanate, 0.5 part by weight of talc, and 11 parts by weight of glass fibers (a weight average fiber length of 3 mm) were uniformly mixed by a V-blender.

There was used an apparatus having a tandem-type extruder having a first, cylinder with a diameter of 40 mm (first extruder), and a second cylinder with a diameter of 50 mm (second extruder) having a die with an orifice diameter of 5 mm at its tip, and a sizing device having an inside diameter of 70 mm and a length of 5 meters connected to each other in this order.

The blend obtained as above was put into the hopper of the tandem-type extruder, and then its mixing in the molten state was started in the first extruder. Carbon dioxide gas under a pressure of 45 $kg/cm^2$ was forced into the first extruder through a central portion of its cylinder. The amount of carbon dioxide gas used was 7 parts by weight per 100 parts by weight of the polyester.

The extruding conditions were as follows: The cylinder temperature of the first extruder was maintained at 270° to 280° C., and the cylinder temperature of the second extruder, at 260° to 270° C. The rotating speed of the screw was adjusted to 30 rpm in the first extruder, and 23 rpm in the second extruder, and the extruding pressure was maintained at 70 kg/cm$^2$.

The extruded and foamed article obtained under the above conditions was continuously passed through the sizing cylinder maintained at 360 mmHg ab. at a rate of 3.5 meters per minute while it was cooled.

The resulting foamed article had a diameter of 37 mm and an expansion ratio of 25, and presented a beautiful appearance. Scarcely any change owing to shrinkage was noted in the product, and the cells were of uniform quality.

Figure 2A:
Figure 2B:
Figure 2C:

Microphotographs of the sections of the resulting foamed article are shown in FIG. 2. FIG. 2-$a$ is a microphotograph of the vicinity of the surface of the foamed product in a section cut perpendicular to the longitudinal length of the foamed article; FIG. 2-$b$ is a microphotograph of the central portion of the foamed article in a section cut perpendicular to the longitudinal direction of the foamed article; and FIG. 2-$c$ is a microphotograph of the central portion of a section cut through the center of the foamed article in the longitudinal direction. In FIG. 2-$c$, the left and right direction of the photograph coincides with the direction of taking up the foamed article. Each scale shown in these photos corresponds to a length of 1 mm.

It is seen from FIG. 2-$a$ that the foamed article of this invention has a relatively thin skin layer. It is seen from FIG. 2-$c$ that the cells are scarcely deformed in the direction of taking up the foamed article. A comparison of FIGS. 2-$a$, 2-$b$ and 2-$c$ shows that the sizes of the cells are relatively uniform at the central portion and the surface layer of the foamed article.

A cubic sample having a size of 20 mm×20 mm×50 mm was cut out from the foamed article, and was allowed to stand for 3 days in an atmosphere kept at 150° C. The volume shrinkage of the sample after standing was 1.5%.

EXAMPLE 2

The same starting materials in the same proportions as in Example 1 were mixed in the molten state in the same way as in Example 1 in the same apparatus as in Example 1.

The unsolidified foamed article extruded from the second extruder into the sizing device was continuously passed at a rate of 3 m/min. through the sizing cylinder at 400 mmHg ab. while it was being cooled gradually.

The resulting foamed article had a diameter of 35 mm and an expansion factor of 22, and presented a beautiful appearance. Scarcely any change owing to shrinkage was noted, and the cells were of uniform quality.

The results and the conditions of the apparatus are shown in Table 1.

EXAMPLE 3

The same raw material composition as in Example 2 was extruded under the same extruding conditions. The foamed article extruded under these conditions was passed continuously through the sizing cylinder at a rate of 4 meters/min. while it was gradually cooled.

The resulting foamed article had a diameter of 45 mm and an expansion ratio of 32, and presents a beautiful appearance. Scarcely any change owing to shrinkage was noted, and the cells were of uniform quality.

The results together with the conditions for the apparatus are shown in Table 1.

COMPARATIVE EXAMPLE 1

The same starting material composition as in Example 1 was extruded under the same extruding conditions, and extruded into the atmosphere to form a foamed article. The sizing device was not used.

In the course of solidification by cooling, the foamed article underwent shrinkage. The foamed article had a diameter of 18 mm, an expansion ratio of 11, and its appearance was deformed into an elliptical form and was poor. The results and the conditions for the apparatus are shown in Table 1.

When the same starting material composition was extruded under the same conditions as above without using a sizing device but a die having an orifice diameter of 2 mm was used, a relatively small-sized foamed article having a diameter of 10 to 12 mm and an expansion factor of 18 to 23 could be obtained.

Figure 3A:
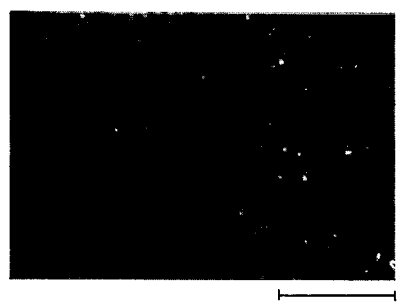
Figure 3B:
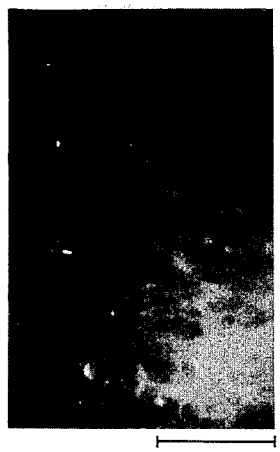

Microphotographs of the cut sections of the foamed article are shown in FIG. 3. FIG. 3-$a$ is a microphotograph of the vicinity of the surface of the foamed article in a section cut perpendicular to the longitudinal direction of the foamed article; and FIG. 3-$b$ is a microphotograph of the vicinity of the surface of the foamed article in a section cut through the central portion of the foamed article in the longitudinal direction. In FIG. 3-$b$, the right and left direction of the photograph coincides with the direction of taking up the foamed article. In these photographs, each scale corresponds to a length of 1 mm.

It is seen from FIGS. 3-$a$ and 3-$b$ that the sizes of the cells of this foamed article were non-uniform, and near the surface of the foamed article, the cells extend long in the take-up direction of the foamed article and are in the collapsed form.

| | | Ex. 2 | Ex. 3 | Comparative Ex. 1 |
|---|---|---|---|---|
| First extruder | Feed section (°C.) | 270 | 270 | 270 |
| | Compression section (°C.) | 280 | 280 | 280 |
| | Metering section (°C.) | 280 | 280 | 280 |
| | Pressure-reduced section (°C.) | 280 | 280 | 280 |
| | Compression section (°C.) | 280 | 280 | 280 |
| | Kneading section (°C.) | 275 | 275 | 275 |
| | Screw speed (rpm) | 30 | 30 | 30 |
| Second extruder | Feed section (°C.) | 275 | 275 | 275 |
| | Compression section (°C.) | 275 | 275 | 275 |
| | Kneading section (°C.) | 270 | 270 | 270 |
| | Die (°C.) | 250 | 250 | 250 |
| | Screw speed (rpm) | 23 | 23 | 23 |
| | Die orifice diameter (mm) | 5 | 5 | 5 |
| | Die pressure (kg/cm$^2$) | 70 | 70 | 70 |
| Pressure in the sizing cylinder (mmHg ab.) | | 360 | 110 | Atmospheric pressure |
| Take-up speed (m/min.) | | 3 | 4 | 2 |
| Diameter of the foamed article (mm) | | 35 | 45 | 18 |
| Density of the foamed article (g/cm$^3$) | | 0.064 | 0.044 | 0.13 |
| Average cell diameter of the foamed article (mm) | | 0.26 | 0.34 | 0.10 |

EXAMPLES 4 to 7

Example 1 was repeated except that the conditions given in Table 2 were used. In Example 7, nitrogen gas was used instead of the carbon dioxide gas. The results are shown in Table 2.

| Ex. No. | Type of the diepoxy compound (parts by weight) | Type of the metal compound (parts by weight) | Type of the fibrous filler (parts by weight) | Expansion ratio | State of the foamed article |
|---|---|---|---|---|---|
| 4 | Diglycidyl ether of bisphenol A (0.1) | Sodium montanate (0.1) | Glass fibers (3) | 10 | Fine cells were uniformly distributed |
| 5 | Diglycidyl ether of bisphenol A (4) | Sodium montanate (0.2) | Glass (0.2) (10) | 16 | Fine cells were uniformly distributed |
| 6 | Diglycidyl ether of bisphenol A (0.8) | Sodium montanate (2) | Glass fibers (10) | 15 | Fine cells were uniformly distributed |
| 7 | Diglycidyl ether of bisphenol (0.3) | Sodium montanate (45) | Glass fibers | 19 | Uniform cells were distributed but their surfaces slightly lacked smoothness. |
| | A (1) | | | | |

EXAMPLES 8 to 13

Using the apparatus shown in Example 1, each of the starting material compositions shown in Table 3 was mixed in the molten state and extruded and foamed under the conditions shown in Table 4. The results are shown in Table 3.

TABLE 3

| Example No. | Polyester | Polyepoxy compound (parts by weight) | Metal compound (parts by weight) | Fibrous material (parts by weight) | Blowing agent (introduced under pressure) | Expansion ratio | State of the foamed article |
|---|---|---|---|---|---|---|---|
| 8 | Polyethylene terephthalate ([η] = 0.64) | Diglycidyl phthalate (0.6) | Sodium montanate (0.1) | Glass fibers (5) | Carbon dioxide (45 kg/cm²) | 21 | Fine cells were distributed uniformly. |
| 9 | Polyethylene terephthalate ([η] = 0.64) | Diglycidyl ether of bisphenol A (1) | Potassium monohydrogen carbonate (0.3) | Glass fibers (5) | Methylene chloride (10 parts by weight) | 25 | Slightly shrunken unless fully cooled. |
| 10 | Polybutylene terephthalate ([η] = 0.90) | Polypropylene glycol diglycidyl ether (DP 3) (1.5) | Sodium stearate (0.3) | Glass fibers (5) | Carbon dioxide (45 kg/cm²) | 17 | Fine cells were distributed uniformly. |
| 11 | Polybutylene terephthalate ([η] = 0.90) | Diglycidyl ether of bisphenol A (1) | Sodium stearate (0.3) | Glass fibers (5) | Pentane (10 parts by weight) | 21 | Fine cells were distributed uniformly. |
| 12 | Polyethylene terephthalate ([η] = 0.64) | Glycerol diglycidyl ether (0.6) | Calcium stearate (0.4) | Glass fibers (5) | Trichlorotrifluoroethane (12 parts by weight) | 28 | Fine cells were distributed uniformly. |
| 13 | Polyethylene terephthalate ([η] = 0.64) | Diglycidyl ether of bisphenol A (1) | Calcium carbonate (1.0) | Carbon fibers (3) | Carbon dioxide (45 kg/cm²) | 22 | Fine cells were distributed uniformly. |

TABLE 4

| | Example No. | 8 | 9 | 10 | 11 | 12 | 13 |
|---|---|---|---|---|---|---|---|
| First extruder | Temperature of the feed section (°C.) | 270 | 270 | 230 | 230 | 270 | 270 |
| | Temperature of the compression section (°C.) | 280 | 280 | 240 | 240 | 280 | 280 |
| | Temperature of the metering section (°C.) | 280 | 280 | 240 | 240 | 280 | 280 |
| | Temperature of the pressure-reduced section (°C.) | 280 | 280 | 240 | 240 | 280 | 280 |
| | Temperature of the compression section (°C.) | 280 | 280 | 240 | 240 | 280 | 280 |
| | Temperature of the kneading section (°C.) | 275 | 275 | 235 | 235 | 275 | 275 |
| | Screw speed (rpm) | 30 | 30 | 30 | 30 | 30 | 30 |
| Second extruder | Temperature of the feed section (°C.) | 275 | 270 | 235 | 230 | 270 | 275 |
| | Temperature of the compression section (°C.) | 275 | 260 | 235 | 235 | 260 | 275 |
| | Temperature of the kneading section (°C.) | 270 | 250 | 230 | 220 | 250 | 270 |
| | Screw speed (rpm) | 23 | 23 | 23 | 23 | 23 | 23 |
| | Die temperature (°C.) | 250 | 235 | 220 | 210 | 235 | 250 |
| | Die orifice diameter (mm) | 5 | 5 | 5 | 5 | 5 | 5 |
| Pressure in the sizing cylinder (mmHg ab.) | | 260 | 260 | 260 | 260 | 260 | 260 |

What we claim is:

1. A process for producing a foamed article of an aromatic polyester by mixing an aromatic polyester, 0.05 to 5% by weight, based on the aromatic polyester, of an epoxy compound which has two or more epoxy groups, 0.05 to 3% by weight based on the aromatic polyester, of a metal compound selected from the group consisting of organic acid salts, inorganic acid salts, and oxides of a metal of Group Ia, IIa or IIIa of the periodic table, and 0.05 to 30% by weight, based on the aromatic polyester, of a blowing agent in a melt extrusion shaping machine while introducing the blowing agent thereinto under pressure, said process comprising mixing said materials with a fibrous filler in said melt extrusion shaping machine, then extruding the molten mixture from said extrusion shaping machine, further expanding the extruded and unsolidified foamed article in an atmosphere maintained at reduced pressure, and solidifying said article by cooling in an atmosphere maintained at reduced pressure.

2. A process according to claim 1 wherein said molten mixture is extruded into a sizing device directly connected to said extrusion shaping machine, and expanded and solidified in said sizing device.

3. A process according to claim 2 wherein said solidification is effected by cooling the peripheral wall of said sizing device with water.

4. A process according to claim 1 or 2 wherein said atmospheres are maintained at a pressure of less than about 560 mmHg ab.

5. A process according to claim 1 wherein the fibrous filler is used in an amount of 1 to 50% by weight based on the aromatic polyester.

6. A process according to claim 5 wherein said fibrous filler is an inorganic fibrous material.

7. A process according to claim 6 wherein said inorganic fibrous material is a glass fiber.

8. A process according to claim 6 wherein said inorganic fibrous material is a carbon fiber.

* * * * *

UNITED STATES PATENT AND TRADEMARK OFFICE
CERTIFICATE OF CORRECTION

PATENT NO. : 4,284,596

DATED : August 18, 1981

INVENTOR(S) : Inokuchi, et al.

It is certified that error appears in the above—identified patent and that said Letters Patent is hereby corrected as shown below:

Page 1, item [73] should read as follows:

Teijin Limited, Osaka, Japan

Signed and Sealed this Twentieth Day of October 1981

[SEAL]

Attest:

GERALD J. MOSSINGHOFF

Attesting Officer

Commissioner of Patents and Trademarks